April 15, 1958  J. G. VEHIGE  2,830,523
VALVE DEVICE
Filed Nov. 21, 1955
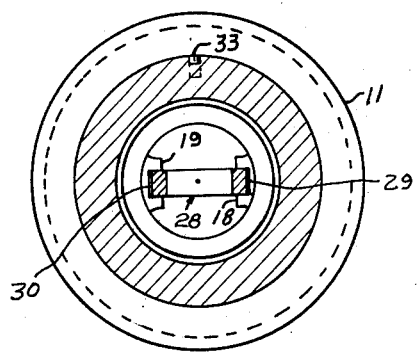
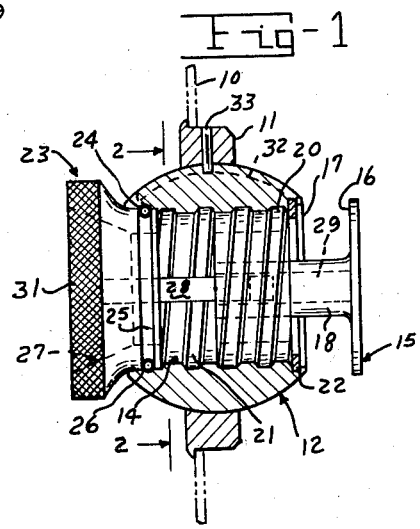
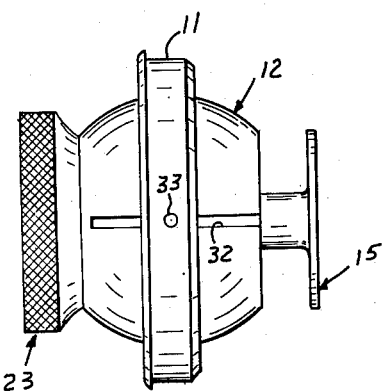
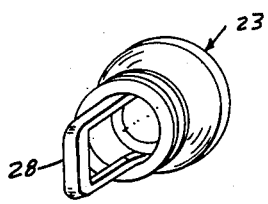
INVENTOR.
JOSEPH G. VEHIGE
BY Wade Koontz
Frank C. Leach Jr.
ATTORNEYS United States Patent Office 2,830,523
Patented Apr. 15, 1958

2,830,523

VALVE DEVICE

Joseph G. Vehige, Woodland Hills, Calif., assignor to the United States of America as represented by the Secretary of the Air Force Application November 21, 1955, Serial No. 548,288

2 Claims. (Cl. 98—40)

This invention relates to an air outlet valve and, more particularly, to a spherical valve element for regulating the volume and direction of air passing therethrough.

One means of controlling both the volume of airflow and its direction is by the use of a spherical element mounted in a supporting ring. This spherical element has a central bore through which the air flows. One type of control means for varying the flow of air through this bore is by providing a rotatable sleeve within the bore that is in threaded engagement with the walls of the bore. Thus, the volume of air is varied by rotating the sleeve. Similarly, the direction of the air is varied by tilting the sleeve. A disadvantage of this type of valve is that the threads may seize during rotation of the sleeve resulting in the entire spherical element rotating in the mounting ring whereby the valve, of course, becomes inoperable. The present invention satisfactorily solves this problem by providing means to prevent rotation of the spherical element even if the threads do seize during rotation of the sleeve.

The primary object of the present invention is to provide an apparatus that prevents a sperical valve element from becoming inoperative.

Other objects of this invention will be readily perceived from the following description.

This invention relates to an air regulating valve assembly comprising a supporting ring and a truncated ball element mounted for universal movement in the supporting ring. The ball element has a passageway therethrough with means controlling the flow of air therethrough. The ball element has a groove in the surface thereof in which a pin on the supporting ring is disposed to prevent rotation of the ball element in the plane of the ring.

The accompanying drawing illustrates a preferred embodiment of the invention, in which Fig. 1 is a sectional view, partly in elevation, of the present invention;

Fig. 2 is a sectional view taken along the line 2—2 of Fig. 1;

Fig. 3 is a plan view of the device of Fig. 1; and

Fig. 4 is a perspective view of the nozzle portion.

Referring to the drawing and particularly Fig. 1, there is shown a wall 10 of a compartment such as an aircraft cabin, for example, to which air is supplied by the valve of the present invention. A supporting ring 11 is secured to the wall 10 by suitable means such as welding or screws. A truncated ball element 12 is mounted in the interior of the supporting ring 11 for universal movement. It will be observed from Fig. 1 that the support ring 11 is curved to rotatably receive the ball element 12 for universal movement therein.

The ball element 12 has a passageway 14 through which air flows into the compartment defined by the wall 10. The flow of air through the passageway 14 is controlled by a valve element 15 that includes a flat portion or plate 16 engaging a face 17 of the truncated ball element 12 to close the passageway 14. The movement of the flat portion 16 to and away from the face 17 of the ball element 12 varies the flow of air through the passageway 14. The valve element 15 has a pair of leg members 18 and 19 extending from the flat portion 16 into the passageway 14 of the ball element 12. The valve element 15 also includes a cylindrical threaded portion 20, which is attached to the leg members 18 and 19 at the end opposite the flat portion 16. This cylindrical portion 20 is received in a threaded part 21 of the ball element 12. The valve element 15 is retained in the ball element 12 by a spring clip 22, which is disposed in a recess in the ball element 12. The spring clip 22 also limits the outward movement of the valve element 15.

A nozzle member 23 is rotatably mounted in the ball element 12 and is retained therein by a spring 24, which is received in a pair of recesses 25 and 26 in the nozzle member 23 and the ball element 12, respectively. This mounting arrangement permits rotative movement of the nozzle member 23 in the ball element 12 but prevents longitudinal movement with respect thereto. It will be observed that the recess 25 is located on the periphery of the nozzle member 23 while the recess 26 is located interiorly of the ball element 12. The nozzle member 23 has an orifice 27 with an outwardly flared outlet portion to disperse the air flowing from the passageway 14 into the compartment defined by the wall 10.

The nozzle member 23 includes a U-shaped portion 28 (see Fig. 4) whose legs are disposed in recesses 29 and 30 of the leg members 18 and 19, respectively, of the valve element 15. This engagement of the legs of the U-shaped portion 28 of the nozzle member 23 in the recesses 29 and 30 of the leg members of the valve element 15 provides a slip or driving connection therebetween whereby the nozzle member 23 and the valve element 15 rotate together and at the same time the flat portion 16 of the valve element moves longitudinally with respect to the nozzle member 23 and the ball element 12.

In the operation of this device, a knurled portion 31 of the nozzle member 23 is gripped to tilt the nozzle member to any position in which it is desired to direct the airflow. The volume of airflow through the ball element 12 is controlled by rotating the nozzle member 23 by gripping the knurled portion 31. If the threaded portion 20 of the valve element 15 seizes in the threaded part 21 of the ball element during rotation of the nozzle member 23, the ball element 12 might rotate with the nozzle member 23. In order to prevent this rotation of the ball element 12 within the plane of the supporting ring 11, cooperating means are provided on the ball element 12 and the supporting ring 11 to prevent such rotation. The surface of the ball element 12 has a groove 32 extending substantially from the face 17 of the ball element 12 to the portion adjacent the nozzle member 23, as clearly shown in Fig. 3. A pin or stud 33 extends through the mounting ring 11 into the groove 32 (see Fig. 1). This engagement of the pin 33 in the groove 32 allows the nozzle to tilt to any desired position and the nozzle member 23 to rotate within the ball element 12 but prevents rotation of the ball element 12 within the plane of the supporting ring 11. Thus, the ball element 12 is still universally mounted in the supporting ring 11 but is prevented from rotating in the plane of the ring 11 whereby the valve device would become inoperative.

It will be understood that the flow of air through the passageway 14 may be controlled by other suitable means than the disclosed threaded control apparatus. The present invention may be employed with any spherical type valve in which it is desired to prevent rotation of the spherical valve in the plane of its mounting or supporting ring.

One advantage of this invention is that it reduces the possibility of valve seizure. Another advantage of this invention is that it permits easier operation of a spherical type valve since only one hand is required for actuation.

For purposes of exemplification, a particular embodiment of the invention has been shown and described according to the best present understanding thereof. However, it will be apparent that changes and modifications in the arrangement and construction of the parts thereof may be resorted to without departing from the true spirit and scope of the invention.

I claim:

1. An air regulating valve assembly comprising a supporting ring, a truncated ball element mounted for universal movement in said supporting ring, said ball element having a passageway therethrough, means controlling the flow of air through said passageway, said ball element having a groove in the surface thereof, and a pin on said supporting ring, said pin being disposed in said groove to prevent rotation of said ball element in the plane of said supporting ring.

2. An air regulating valve assembly comprising a supporting ring, a truncated ball element mounted for universal movement in said supporting ring, said ball element having a passageway therethrough provided with screw threads, means controlling the flow of air through said passageway including a threaded portion engaging said screw threads of said passageway, said ball element having a groove in the surface thereof, and a pin on said supporting ring, said pin being disposed in said groove to prevent rotation of said ball element in the plane of said supporting ring.

References Cited in the file of this patent

UNITED STATES PATENTS

| | | |
|---|---|---|
| 1,299,586 | Leibing | Apr. 8, 1919 |
| 1,559,057 | Stewart | Oct. 27, 1925 |
| 2,189,502 | Johnston | Feb. 6, 1940 |
| 2,516,805 | Rother et al. | July 25, 1950 |
| 2,596,869 | Ross | May 13, 1952 |
| 2,672,806 | Vehige | Mar. 23, 1954 |

FOREIGN PATENTS

| | | |
|---|---|---|
| 888,359 | France | Sept. 6, 1943 |